United States Patent [19]

Grohmann

[11] Patent Number: 4,995,918
[45] Date of Patent: Feb. 26, 1991

[54] PROCESS AND DEVICE FOR AUTOGENOUS CUTTING WITH LIQUID OXYGEN

[75] Inventor: Paul Grohmann, Maria-Enzersdorf, Austria

[73] Assignee: Messer Grieshiem GmbH, Fed. Rep. of Germany

[21] Appl. No.: 386,943

[22] Filed: Jul. 31, 1989

[30] Foreign Application Priority Data

Aug. 12, 1988 [DE] Fed. Rep. of Germany ....... 3827417

[51] Int. Cl.⁵ .............................................. B23K 7/00
[52] U.S. Cl. ...................................... 148/9 R; 266/48
[58] Field of Search ........................ 148/9 R; 266/48

[56] References Cited

U.S. PATENT DOCUMENTS 2,205,499  6/1940  Smith ................................. 148/9 R
4,765,846  8/1988  Grohmann .......................... 148/9 R Primary Examiner—S. Kastler
Attorney, Agent, or Firm—Connolly & Hutz

[57] ABSTRACT

In autogenous cutting oxygen in liquid form is put under high pressure and flows to the cutting site through a liquid jet cutting nozzle. An increase in the cutting speed and in the cutting quality level is achieved in that the super-cooled liquid oxygen jet emerging from the nozzle has a temperature that is below the boiling temperature of the oxygen at ambient pressure.

12 Claims, 1 Drawing Sheet

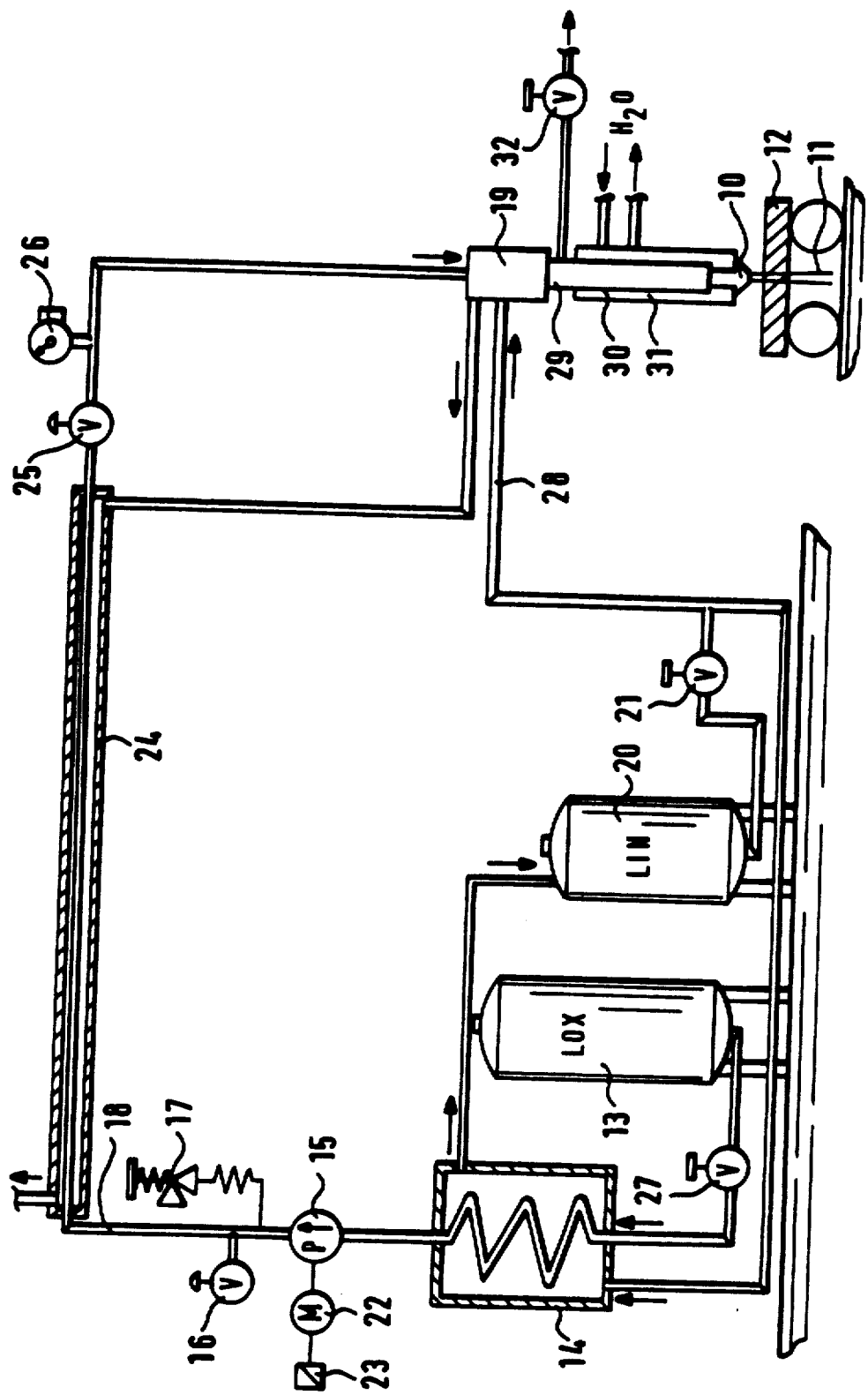

PROCESS AND DEVICE FOR AUTOGENOUS CUTTING WITH LIQUID OXYGENcl BACKGROUND OF THE INVENTION

When a high-pressure jet of liquid oxygen is used for cutting, as is known, for example, from West German laid-open application No. 35 43 657, the oxygen from the tank, where it is in a boiling state, is raised to a pressure of, for example, 500 bar by a high-pressure oxygen pump, and it then flows to the cutting site through a liquid jet cutting nozzle.

SUMMARY OF INVENTION

The invention is concerned with providing an increase in the cutting speed as well as the cutting quality of such a process.

By means of the proposed supercooling of the supercooled high-pressure liquid oxygen jet, it is advantageously achieved that the high-pressure liquid oxygen jet emerging from the nozzle is thin and tightly directed, and it hardly diverges and only starts to expand at a fairly large distance from the nozzle tip. Moreover, the supercooled jet initiates a high impulse which, in conjunction with the above-mentioned jet shape, guarantees cutting speeds and cutting quality levels that are 30% to 80% higher than with processes without supercooling of the jet.

THE DRAWING

The single FIGURE illustrates schematically a device to carry out the process according to the invention.

DETAILED DESCRIPTION

The drawing shows a liquid jet cutting nozzle 10, from which a jet 11 of liquid oxygen emerges at a high speed and strikes a workpiece 12 that is to be cut. The supply of liquid oxygen comes from a supply device designed as an insulated storage tank 13, which is followed by an inlet valve 27, a cooler 14 as well as a high-pressure pump 15. On the outlet side, the high-pressure pump 15 is connected to an insulated high-pressure line 18, with a liquid oxygen high-pressure relief valve 16 as well as a rupture disk 17 in between. The high-pressure line 18 is connected to a burner 19, in which the liquid jet cutting nozzle 10 is affixed.

The cooler 14 is connected to a supply device designed as an insulated storage tank 20 for the coolant, liquid nitrogen. The nitrogen inlet valve is designated as 21. As a result of the liquid nitrogen, whose boiling point at 1,013 mbar is 13K lower than that of oxygen, the liquid oxygen is supercooled to such an extent that it emerges from the liquid jet cutting nozzle 10 at a temperature that is several K, for example, in the range of 1K to 10K below the boiling point of the liquid oxygen at 1,013 mbar. Depending on the nozzle diameter, the liquid oxygen can be brought up to pressure of 500 bar, by means of the high-pressure pump 15. The power needed for this is provided by a three-phase current motor 22 with a rated speed of 1,470 rpm at 50 Hz. Power transmission is via a pulley and five V-belts, with a conversion of 280:125 mm and a reducing factor of 2.24. A frequency converter 23 can be used to select a frequency ranging from 0 to 75 Hz, thus corresponding to 0 to 985 rpm at the pump shaft.

The oxygen supply flows from the storage tank 13 via a copper pipe to the high-pressure pump 15, and then into the high-pressure line 18 made of stainless steel to the burner 19. The high-pressure line 18 is jacketed by a stainless steel pipe 24. On the basis of the counter-current principle, liquid nitrogen flows through the cooling jacket to cool the high-pressure line 18 which carries the liquid oxygen, whereby the liquid nitrogen is likewise taken from the storage tank 20 via line 28. Moreover, in the high-pressure line 18, there is a liquid oxygen high-pressure valve 25 as well as a contact pressure gauge with minimum-maximum contact 26. As illustrated, the liquid nitrogen line 28 passes through the burner 19 so that, in the burner 19, the liquid oxygen borehole is surrounded by a cooling jacket 29 of liquid nitrogen. This cooling jacket is, in turn, enclosed in insulation 30 and water cooling 31. The nitrogen blow-off valve connected to the burner 19 is designated by the number 32 and serves to eliminate gaseous nitrogen, which results from the cooling of the burner. By means of the cooling devices provided (cooler 14 as well as cooling of the high-pressure line 18 and of the burner 19), it is advantageously achieved that the heat generated by friction and compression forces is also eliminated and that the liquid oxygen jet emerges supercooled from the nozzle, thus bringing about the above-mentioned advantages. An especially advantageous, compact arrangement is achieved when the cooler 14, the high-pressure pump 15 and the burner 19 are positioned on a shared frame, whose height is preferably adjustable and which is affixed to a sliding transverse carriage of a portal cutting machine. The supply of liquid oxygen and liquid nitrogen preferably comes via movable, vacuum-insulated metal corrugated-pipe hoses.

What is claimed is:

1. In a process for autogenous cutting, in which the oxygen in liquid form is put under high pressure and flows to the cutting site through a liquid jet cutting nozzle, the improvement being in that the liquid oxygen jet emerging from the nozzle is supercooled and has a temperature that lies below the boiling temperature of the oxygen at ambient pressure to increase the cutting speed and the quality level of the liquid oxygen autogenous cutting.

2. Process according to claim 1, wherein the outlet temperature of the liquid oxygen jet lies in the range of 1K to 10K below the boiling point of the oxygen at ambient pressure.

3. Process according to claim 1 or 2, wherein the liquid oxygen is brought up to a pressure of between 50 and 500 bar, by means of a high-pressure pump.

4. Process according to claim 3, wherein before being brought up to high pressure, the liquid oxygen is supercooled with a coolant.

5. Process according to claim 4, wherein the supercooling of the liquid oxygen takes place in a precooler installed before the high-pressure pump.

6. Process according to claim 3, wherein the liquid oxygen is brought up to a pressure between 150 and 400 bar.

7. Process according to claim 4, wherein the coolant is liquid nitrogen.

8. In a device for autogenous cutting in which oxygen in liquid form is put under high pressure and flows to the cutting site through a liquid jet cutting nozzle, including a supply device for the liquid oxygen, a high-pressure pump connected on the outlet side with the liquid jet cutting nozzle, the improvement being in that, said high-pressure pump being located between said supply device and said nozzle, a cooler being located between said supply device and said high-pressure pump, said cooler flow communicating with a supply device for a coolant capable of supercooling the liquid oxygen, and the liquid oxygen flowing through said cooler to become supercooled.

9. Device according to claim 8, wherein a high-pressure line is between said high-pressure pump and said nozzle and is equipped with a cooling jacket.

10. Device according to claim 8 or 9, wherein said nozzle is positioned in a burner having a liquid oxygen borehole surrounded by a cooling jacket of liquid nitrogen which, in turn, is enclosed in insulation and water cooling.

11. Device according to claim 10, wherein said cooler and said high-pressure pump and said burner 19 are positioned on a common frame whose height is adjustable and which is affixed to a sliding transverse carriage of a portal cutting machine.

12. Device according to claim 9, wherein said supply device is a liquid nitrogen supply device, and said cooling jacket is made of liquid nitrogen.

* * * * *